United States Patent
Sherer et al.

(10) Patent No.: US 6,925,078 B1
(45) Date of Patent: Aug. 2, 2005

(54) NETWORK ADAPTOR DRIVER WITH DESTINATION BASED ORDERING

(75) Inventors: William Paul Sherer, Danville, CA (US); Glenn Connery, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/253,418

(22) Filed: Feb. 19, 1999

Related U.S. Application Data

(63) Continuation of application No. 08/850,906, filed on May 2, 1997, now Pat. No. 5,875,176.
(60) Provisional application No. 60/032,124, filed on Dec. 5, 1996.

(51) Int. Cl.[7] ............................................... H04L 12/28
(52) U.S. Cl. ....................................... 370/389; 370/465
(58) Field of Search ................................ 370/312, 389, 370/390, 394, 395, 400, 465, 411–418, 535

(56) References Cited

U.S. PATENT DOCUMENTS

| | | | | |
|---|---|---|---|---|
| 5,375,118 A | * | 12/1994 | Rao et al. ................... | 370/60.1 |
| 5,406,556 A | * | 4/1995 | Widjaja et al. .............. | 370/381 |
| 5,602,830 A | * | 2/1997 | Fichou et al. ................ | 370/232 |
| 5,612,959 A | * | 3/1997 | Takase et al. ............... | 370/390 |
| 5,732,082 A | * | 3/1998 | Wartski et al. .............. | 370/395 |
| 5,818,838 A | * | 10/1998 | Backes et al. .............. | 370/390 |

* cited by examiner

*Primary Examiner*—Man U. Phan
*Assistant Examiner*—Toan Nguyen

(57) ABSTRACT

A network transmitter (driver or adaptor/driver combination) reorders packets received for transmission from a higher layer protocol based on packet destinations. The invention reduces bottlenecks at the transmitter and potentially throughout network intermediate system. Destination based reordering may be accomplished through alternative methods, some alternatives taking into account the order at which packets to different destinations are queued by a higher layer protocol.

11 Claims, 5 Drawing Sheets

|  | LAYER NAME (NUMBER) | DEVICES | DATA | PROTOCOLS |
|---|---|---|---|---|
| HIGH | HIGHER LAYER PROTOCOLS | | | |
| | APPLICATION LAYER (5) | | FILES | FTP, HTTP |
| | TRANSPORT LAYER (4) | ROUTERS | ROUTING PACKETS | TCP, UDP |
| | ROUTING LAYER (3) | ROUTERS | ROUTINGS PACKETS | IP |
| | DATA LINK LAYER (2) | BRIDGES | PACKETS | ETHERNET |
| LOW | PHYSICAL LAYER (0,1) | REPEATERS | BITS | ETHERNET |

FIG. 4 (Prior Art)

NETWORK ADAPTOR DRIVER WITH DESTINATION BASED ORDERING

This application is a continuation of and claims the benefit of U.S. application Ser. No. 08/850,906, filed May 2, 1997 now U.S. Pat. No. 5,875,176, the disclosure of which is incorporated by reference, and claims priority from provisional patent application Ser. No. 60/032,124, filed Dec. 5, 1996, which discussed a number of background concepts related to the invention.

BACKGROUND OF THE INVENTION

The current invention relates to the field of electronic circuits. More particularly, the current invention relates most directly to improvements in networked computer environments and has particular applications to the transmission of information between digital devices over a communications medium. The invention also is concerned with the interface between a network adaptor and its host operating system in order to improve network performance and reduce network operation burden on a host processor. The invention concerns in some details a network adaptor driver, which generally consists of program code running on a host's CPU which controls or interfaces with aspects of adaptor operation.

The present invention has applications to the field of computer systems and networks. A very wide variety of types of computer systems and networks exist, each having variations in particular implementations. The present invention will be described with reference to particular types of systems for clarity but this should not be taken to limit the invention, and it will be apparent to those of skill in the art that the invention has applications in many different types of computer systems. The invention therefore should not be seen as limited except as specifically herein provided.

Digital computer networks have become ubiquitous in academic, industry, and office environments. A number of different aspects of computer networks are discussed in co-assigned pending U.S. applications Ser. Nos. 08/313,674; 08/542,157; 08/506,533; and 08/329,714 each of which are incorporated herein by reference.

Networking Devices Standards

This specification presumes familiarity with the general concepts, protocols, and devices currently used in LAN networking and WAN internetworking applications such as, for example, the IEEE 802 and ISO 8802 protocol suites and other series of documents released by the Internet Engineering Task Force that are publicly available and discussed in more detail in the above-referenced patent applications and will not be fully discussed here.

FIG. 1

FIG. 1 illustrates a local area network (LAN) 40 of a type that might be used today in a moderate-sized office or academic environment and as an example for discussion purposes of one type of network in which the present invention may be effectively employed. LANs are arrangements of various hardware and software elements that operate together to allow a number of digital devices to exchange data within the LAN and also may include internet connections to external wide area networks (WANs) such as WANs 82 and 84. Typical modern LANs such as 40 are comprised of one to many LAN intermediate systems (ISs) such as ISs 60–62 and 67 that are responsible for data transmission throughout the LAN and a number of end systems (ESs) such as ESs 50a–d, 51a–c, and 52a–g, that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN ISs 60–61 are referred to as bridges and WAN ISs 64 and 66 are referred to as routers, and IS 67 is referred to as a repeater, however many different LAN configurations are possible, and the invention is not limited in application to the network shown in FIG. 1.

The LAN shown in FIG. 1 has segments 70a–e, 71a–e, and 72a–e, and 73a. A segment is generally a single interconnected medium, such as a length of contiguous wire, optical fiber, or coaxial cable or a particular frequency band. A segment may connect just two devices, such as segment 70a, or a segment such as 72d may connect a number of devices using a carrier sense multiple access/collision detect (CSMA/CD) protocol or other multiple access protocol such as a token bus or token ring. A signal transmitted on a single segment, such as 72d, is simultaneously heard by all of the ESs and ISs connected to that segment.

LANs also may contain a number of repeaters, which is one configuration possible shown for device 67. A repeater generally repeats out of each of its ports all data received on any one port, such that the network behavior perceived by ESs such as 50d–f is identical to the behavior they would perceive if they were wired on the same segment such as 52d–g. Repeaters configured in a star topology, such as 67, are also referred to as hubs. In alternative network topologies, device 67 could be a bridge as described below.

Drivers, Adaptors, and LAN Topology

Each of the ISs and ESs in FIG. 1 includes one or more adaptors and a set of drivers. An adaptor generally includes circuitry and connectors for communication over a segment and translates data from the digital form used by the computer circuitry in the IS or ES into a form that may be transmitted over the segment, e.g., electrical signals, optical signals, radio waves, etc. An ES such as 50b will generally have one adaptor for connecting to its single segment. A LAN IS such as 61 will have five adaptors, one for each segment to which it is connected. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

LANs may vary in the topology of the interconnections among devices. In the context of a communication network, the term "topology" refers to the way in which the stations attached to the network are interconnected. Common topologies for LANs are bus, tree, ring, and star. LANs may also have a hybrid topology made up of a mixture of these. The overall LAN pictured in FIG. 1 has essentially a tree topology, but incorporating one segment, 72d, having a bus topology, and incorporating one segment 70d having a star topology. A ring topology is not shown in FIG. 1, but it will be understood that the present invention may be used in conjunction with LANs having a ring topology.

Other Network Devices

The LAN ISs in LAN 40 include bridge/switches 60–63. Bridges are understood in the art to be a type of computer optimized for very fast data communication between two or more segments. A bridge according to the prior art generally makes no changes to the packets it receives on one segment before transmitting them on another segment. Bridges are not necessary for operation of a LAN and, in fact, in prior art systems bridges are generally invisible to the ESs to which they are connected and sometimes to other bridges and routers.

FIG. 2 is a diagram illustrating a server 500*t* transmitting to three receivers 500*a*, 500*b* and 500*c* via a network 84 according to one embodiment of the present invention.

Packets

In a LAN such as 40, data is generally transmitted between ESs as independent packets, with each packet containing a header having at least a destination address specifying an ultimate destination and generally also having a source address and other transmission information such as transmission priority. ESs generally listen continuously to the destination addresses of all packets that are transmitted on their segments, but only fully receive a packet when its destination address matches the ES's address and when the ES is interested in receiving the information contained in that packet.

FIG. 3 depicts an example of a packet as it may be transmitted to or from router 64 on LAN segment 73*a*. The example shown is essentially an Ethernet packet, having an Ethernet header 202 and a 48-bit Ethernet address (such as 00:85:8C:13:AA) 204, and an Ethernet trailer 230. Within the Ethernet packet 200 is contained, or encapsulated, an IP packet, represented by IP header 212, containing a 32 bit IP address 214 (such as 199.22.120.33). Packet 200 contains a data payload 220 which holds the data the user is interested in receiving or holds a control message used for configuring the network. Many other types and configurations of packets are known in the networking art and will be developed in the future.

Layers

An additional background concept important to understanding network communications is the concept of layered network protocols. Modern communication standards, such as the TCP/IP Suite and the IEEE 802 standards, organize the tasks necessary for data communication into layers. At different layers, data is viewed and organized differently, different protocols are followed, and different physical devices handle the data traffic. FIG. 4 illustrates one example of a layered network standard having a number of layers, which we will refer to herein as the Physical Layer, the Data Link Layer, the Routing Layer, the Transport Layer and the Application Layer. These layers correspond roughly to the layers as defined within the TCP/IP Suite. (The 802 standard has a different organizational structure for the layers and uses somewhat different names and numbering conventions.)

An important ideal in layered standards is the ideal of layer independence. A layered protocol suite specifies standard interfaces between layers such that, in theory, a device and protocol operating at one layer can coexist with any number of different protocols operating at higher or lower layers, so long as the standard interfaces between layers are followed.

Adaptor to Host Interface

Another aspect of networks is the interface between the network and the host operating system or processors that transmit data via the network. Some types of network protocols may require a large amount of attention from a host processor. This can be undesirable where a hosts activity on the network impinges on the hosts processor's ability to perform other host functions such as running user applications. Adaptors may also differ in their ability to buffer network traffic. Some adaptors rely on the host to buffer most network traffic and do not include a large amount of buffer memory on the adaptor itself.

Increasing Traffic Capacity of Some Network Devices Create a Need for New Solutions to Improve Network Performance In recent years, the amount of data users wish to transmit over a network has increased dramatically. This increase has placed an increasingly heavy burdens on all parts of the network. A number of existing networks include a mixture of components or segments, some capable of operating at a maximal speed of the network and others operating at slower speeds.

What is needed is an improved network and components allowing for greater utilization of network resources in a distributed network environment and with techniques for preventing bottlenecks in slower components in a distributed network from unduly degrading overall network performance or preventing full utilization of faster components.

SUMMARY OF THE INVENTION

In general terms, the present invention comprises techniques and devices for an improved computer network and methods and devices for the operation thereof.

Reordering Transmitted Packets at a Network Adaptor

In this aspect, the present invention is a network adaptor driver with a destination based ordering scheme where multiple packets of data are ordered before transmit to ensure fullest utilization of distributed network resources.

A network represents a distributed environment in which the various components (segments and devices) have differing ability to handle network traffic. The introduction of very high speed network components such as 100 Megabit Ethernet and Gigabit Ethernet increases the differences in ability of various parts of the network to handle data traffic. In addition, the ability of some network components to handle traffic varies over time. A network attached file server, for example, may communicate with large numbers of other network attached devices.

Modern network operating systems (OSs) such as Netware and Windows95 provide interfaces allowing protocols running within those OSs to request packet transmission from the underlying network hardware. In prior art systems, it is generally assumed that these packets will be transmitted by the network hardware in a FIFO order, with packets transmitted by the hardware in the order they are received from the protocols running on the OSs.

However, work in network bridges and switches has shown the FIFO ordering need only be preserved among packets from a particular source that are going to a particular destination (i.e. with a particular source/destination address pair) in order for the network to function as the protocols expect. For example, if node A is transmitting to nodes B and C then the order of packets from A to B must be preserved and the order of packets from A to C must be preserved, but it is not necessary to preserve the order of packet from A to B with respect to the packets from A to C.

Therefore it is possible to improve network parallelism at layer 2 and below by reordering packets within the adaptor hardware and driver, transparently to the higher layer protocols requesting transmission of those packets, in order to distribute packets to as many different ultimate destinations as possible. This avoids the transmitter waiting for slower network paths. This technique also can reduce bottlenecks developing further down the transmission stream in network ISs. According to the invention, this redistribution is accomplished while still preserving the order of packets sent to any particular destination from any particular source. Thus, the invention effective spreads packets over a number of destinations at layer 2, without the need for modifying higher layer protocols.

Specific aspects of the invention will be better upon reference to the following description of specific embodiments and the attached claims.

BRIEF DESCRIPTION OF THE DRAWINGS

FIG. 4 is a diagram illustrating a layered network protocol.

DETAILED DESCRIPTION OF SPECIFIC EMBODIMENTS

Figure 1:
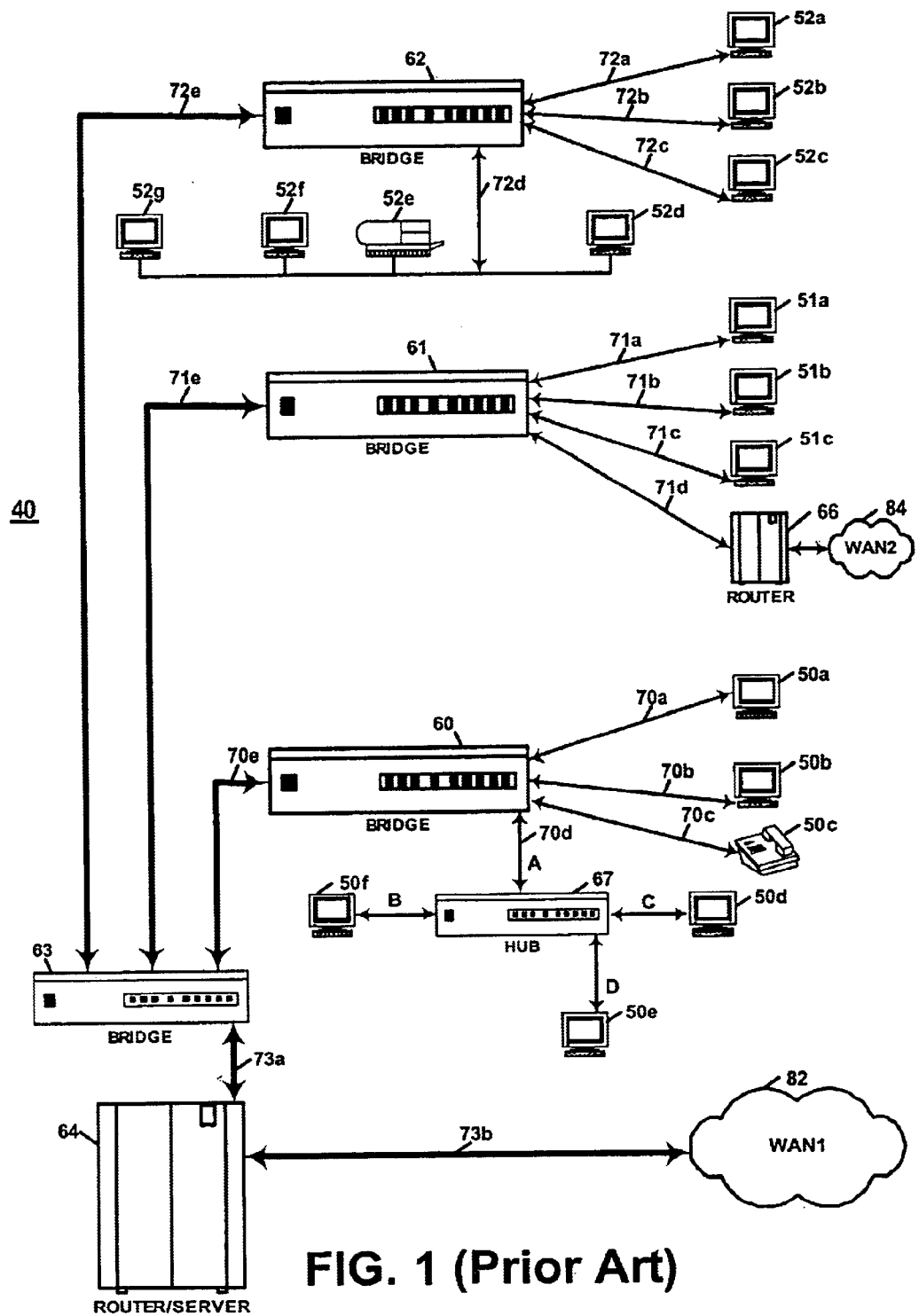
FIG. 1 is a diagram of a network of one type in which the invention may be effectively employed.
Figure 2:
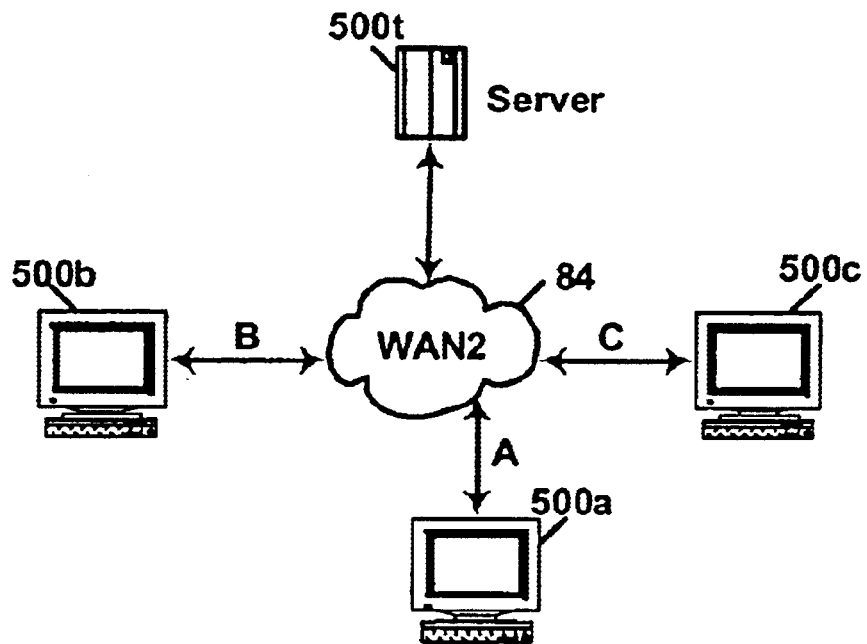
FIG. 2 is a diagram illustrating a server transmitting to three receivers via a network to illustrate aspects of the invention.
Figure 3:
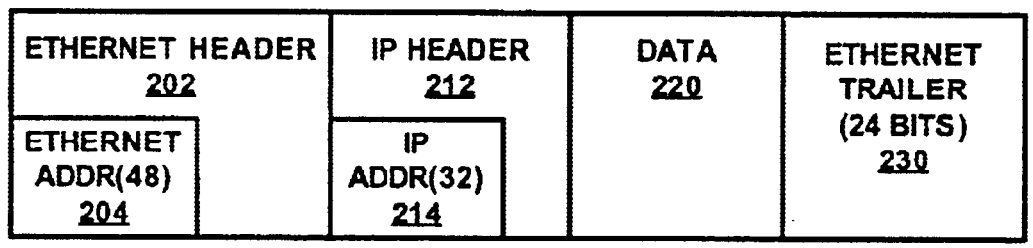
FIG. 3 is a diagram of a prior art packet as an example of a type of data unit upon which the invention may be effectively employed.
Figure 5:
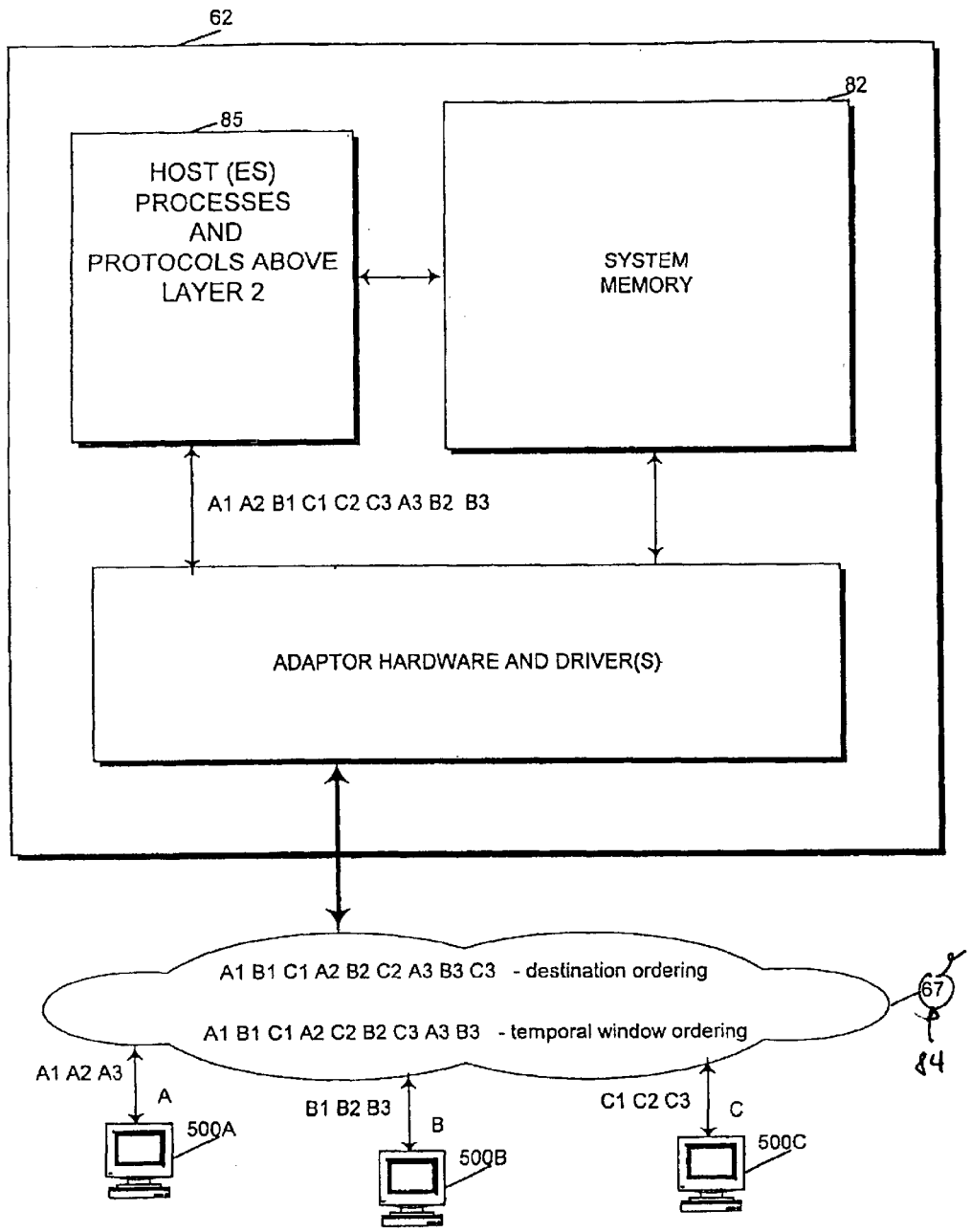
FIG. 5 is a diagram of an adaptor on a network with indicated packet reordering according to two different embodiments of the invention.

According to the invention, an adaptor and/or adaptor driver reorder packets to be transmitted based on the destinations of those packets. The invention effectively distributes packets more evenly through various network transmission paths and thus increases overall network throughput. The invention also effectively reduces bottlenecks at the transmitter. Packets to be transmitted may be reordered according to the invention using any number of different destination address based ordering schemes, examples of which are discussed below. FIG. 5 is a block diagram of a host with an adaptor driver according to an embodiment of the invention showing two example destination-based ordering schemes according to embodiments of the invention.
Destination Address Based Ordering

EXAMPLE 1

In one destination address based ordering scheme, all packets from the same source address destined for the same destination are placed in a queue created in system memory. Therefore, as packets are received from higher layer protocols and placed in memory for transmission, associated with each destination address is essentially a FIFO queue of packets addressed to that particular device. According to one approach, the invention samples all existing destination queues in memory, in round-robin fashion, and sends one (or a group) of packets from all queues containing packets, in the round-robin order. This approach distributes packets to all destination without regard to the order at which packets to different destinations were queued by the higher layer protocol.

As an example of this first approach, assume higher layer protocols submitted packets in following order for destinations A, B and C:

A1, A2, B1, C1, C2, C3, A3, B2, B3

For "round-robin" destination based ordering the typical transmission order would be:

A1, B1, C1, A2, B2, C2, A3, B3, C3.

It will be seen that if, for example, there is a bottleneck in the path to C such that after one packet is transmitted to C the adaptor must wait a relative long time before transmitting another packet to C, the second ordering is more likely to get the most packets through the network in the least amount of time than the first ordering.
Destination Address Based Ordering

EXAMPLE 2

In this embodiment, the invention attempts to preserve the original order of packets to varying destinations as much as possible while still distributing packets to all destinations. In other words, this is an attempt to reduce the variation between the time when packets are queued by a higher layer protocol and when the packets are actually transmitted on the network, which is a form of jitter. In this embodiment, a temporal window is defined in which a packet from each destination will be selected for transmission. However, the order in which the packets within the temporal window are transmitted is determined by the temporal order that they were submitted to the adaptor driver or interface by the higher layer protocol.

Assume again a protocol or protocols submitted packets in following order for destinations A, B and C:

A1, A2, B1, C1, C2, C3, A3, B2, B3

For temporal window based ordering the typical transmission order would be:

A1, B1, C1 | A2, C2, B2 | C3, A3, B3

Observing the two transmission order examples, one can observe that the destination address based ordering creates a uniform packet ordering where the temporal window approach minimizes the time to transmission for a given packet while still distributing packets over all destinations.
Destination Address Based Ordering

OTHER EXAMPLES

Any number of other algorithms are possible for determining the exact transmission ordering of packets and different mechanisms may be chosen in different environments. Other embodiments are possible in which packets are delayed by no more than a certain amount of time before transmission on a network, despite the destination based ordering considerations. However, in network environments presently in contemplation, the one of the more simplified ordering schemes just described would be represent a preferred embodiment.

It is also possible that an adaptor driver according to the invention will include multiple alternative methods for determining the order for transmitting destination-spread packets, with a particular algorithm selectable by a user depending on the specific requirements of the network in which the adaptor is used.

It is also possible that an adaptor driver according to the invention may include a programmable scheme which may take into account differences in speed and performance paths to particular destinations to maximize network parallelism.

The invention has now been explained with reference to specific and alternative embodiments. Other embodiments will be obvious to those of skill in the art. The invention therefore should not be limited except as provided for in the attached claims as extended by allowable equivalents.

What is claimed is:

1. A network adaptor driver comprising:

a first interface for receiving data packets in a first order, wherein a first plurality of said data packets have a first destination address corresponding to a first destination and a second plurality of said data packets have a second destination address corresponding to a second destination that is different than said first destination, wherein said first destination address and said second destination address represent ultimate destinations of said first and second pluralities of data packets, respectively;

a second interface for transmitting said data packets to said first and second destinations; and a mechanism for selecting from said data packets according to their respective destination addresses, said mechanism for establishing a second order for transmitting said data packets that is different from said first order, said second order based on respective destination addresses of said data packets, said second order comprising all of said data packets received in said first order, said second order established by first selecting one data packet having said first destination address and second selecting one data packet having said second destination address, wherein said first selecting and said second selecting are alternated such that in said second order said data packets are alternately distributed between said first and second destinations.

2. The network adaptor driver according to claim 1 wherein said selecting is determined solely by said first and second destination addresses.

3. The network adaptor driver according to claim 1 wherein said selecting is determined partly by said first and second destination addresses and partly by when a data packet is received by said first interface.

4. A method for improved network parallelism comprising:

receiving data packets in a first order, wherein a first plurality of said data packets have a first destination address corresponding to a first destination and a second plurality of said data packets have a second destination address corresponding to a second destination that is different from said first destination, wherein said first destination address and said second destination address represent ultimate destinations of said first and second pluralities of data packets, respectively;

prior to transmitting said data packets, establishing a second order for transmitting said data packets that is different from said first order, said second order based on respective destination addresses of said data packets, said second order comprising all of said data packets received in said first order, said second order established by first selecting one data packet having said first destination address and second selecting one data packet having said second destination address, wherein said first selecting and said second selecting occur on alternate turns such that in said second order said data packets are alternately distributed between said first and second destinations; and transmitting said data packets.

5. The method according to claim 4 wherein said establishing is solely according to said first and second destination addresses.

6. The method according to claim 4 wherein said establishing is determined partly by said first and second destination addresses and partly by when a data packet is received by said first interface.

7. The method according to claim 4 wherein said establishing is determined by a preset, nonadjustable scheme.

8. The method according to claim 4 wherein said establishing is determined by a programmable scheme which takes into account differences in speed and performance paths to particular destinations.

9. A device comprising:

a first interface for receiving data packets in a first order, wherein a first plurality of said data packets have a first destination address corresponding to a first destination and a second plurality of said data packets have a second destination address corresponding to a second destination that is different from said first destination, wherein said first destination address and said second destination address represent ultimate destinations of said first and second pluralities of data packets, respectively; and a second interface for transmitting said data packets to said first and second destinations;

wherein said device executes a driver that selects from said data packets according to their respective destination addresses, said driver for establishing a second order for transmitting said data packets that is different from said first order, said second order based on respective destination addresses of said data packets, said second order comprising all of said data packets received in said first order, said second order established by first selecting one data packet having said first destination address and second selecting one data packet having said second destination address, said first selecting and said second selecting alternately continued through said data packets such that in said second order said data packets are alternately distributed between said first and second destinations.

10. The device according to claim 9 wherein said driver selects from data packets solely by said first and second destination addresses.

11. The device according to claim 9 wherein said driver selects from said data packets partly by said first and second destination addresses and partly by when a data packet is received by said first interface.

* * * * *